United States Patent [19]
Twigg

[11] Patent Number: 4,760,190
[45] Date of Patent: Jul. 26, 1988

[54] AMINE PRODUCTION

[75] Inventor: Martyn V. Twigg, Yarm, England

[73] Assignee: Imperial Chemical Industries PLC, London

[21] Appl. No.: 888,375

[22] Filed: Jul. 23, 1986

[30] Foreign Application Priority Data

Aug. 1, 1985 [GB] United Kingdom ............... 8519425

[51] Int. Cl.$^4$ ............................................. C07C 85/06
[52] U.S. Cl. ................................................... 564/480
[58] Field of Search ......................................... 564/480

[56] References Cited

U.S. PATENT DOCUMENTS

| 3,390,184 | 6/1968 | Moss et al. | 564/480 |
| 3,929,889 | 12/1975 | Squire | 564/408 |
| 4,014,933 | 3/1977 | Boettger et al. | 564/480 |
| 4,123,462 | 10/1978 | Best | 564/480 |
| 4,151,204 | 4/1979 | Ichikawa et al. | 564/480 |
| 4,153,581 | 5/1979 | Habermann | 564/480 |
| 4,495,369 | 1/1985 | Werner et al. | 564/480 |
| 4,647,701 | 3/1987 | Gibson | 564/480 |

FOREIGN PATENT DOCUMENTS

| 21073 | 1/1981 | European Pat. Off. . |
| 3223217 | 1/1983 | Fed. Rep. of Germany . |
| 1167412 | 10/1969 | United Kingdom . |
| 1361363 | 7/1974 | United Kingdom . |
| 1575481 | 9/1980 | United Kingdom . |
| 1585480 | 3/1981 | United Kingdom . |

Primary Examiner—Glennon H. Hollrah
Assistant Examiner—John A. Sopp
Attorney, Agent, or Firm—Cushman, Darby & Cushman

[57] ABSTRACT

Alkylamines are produced by reacting an alcohol with an amino compound, especially ammonia, using a catalyst containing nickel and/or cobalt and at least one difficulty reducible metal oxide, e.g. alumina, particularly alumina plus a rare earth, and having a high nickel/cobalt content.

5 Claims, No Drawings

AMINE PRODUCTION

This invention relates to amine production and in particular to the production of alkylamines.

The reaction between an amino compound of the formula R'R"R'"N where R', R" and R'", which may be the same or different, are hydrogen or alkyl groups, i.e. ammonia or alkyl amines, and an alcohol ROH, where R is an alkyl group and differs from R', is reversible and can be represented by the equation $$R'R''R'''N + ROH \rightleftharpoons R R''R'''N + R'OH.$$

The reaction may be catalysed by certain metals, e.g. silver, nickel, or copper. Hence by passing a mixture of at least one such alcohol and at least one such amino compound over or through a bed of catalyst, the reaction proceeds towards equilibrium. The products, and the proportions thereof, obtained will of course depend on the nature and proportions of the reactants, the temperature, and the activity of the catalyst of that temperature. Generally a mixture of amines will be produced. For example if an alcohol ROH in admixture with ammonia is passed over a suitable catalyst, the products will comprise a mixture of the primary, secondary, and tertiary amines as a result of the reactions $$ROH + NH_3 \rightleftharpoons RNH_2 + H_2O$$

$$ROH + RNH_2 \rightleftharpoons R_2NH + H_2O$$

$$ROH + R_2NH \rightleftharpoons R_3N + H_2O$$

In addition to the formation of alkylamines, catalysts used heretofore, for example nickel supported on kieselguhr, have given rise to appreciable quantities of by-products, particularly hydrocarbons such as methane and also high boiling contaminants, particularly nitriles and amides. To minimize the formation of such by-products, the reaction temperature has normally been kept relatively low which, of course, will affect the composition of the alkylamines product. Consequently the composition of the alkylamines product has often not been that desired and extensive recycling of the undesired alkylamine or alkylamines has been necessary.

It has been proposed in DE-A-3223217 to employ for this reaction a catalyst prepared by calcination and production of a precipitate having the formula $$Ni_6Al_2(OH)_{16}CO_3.4H_2O$$

In the catalysts formed by the calcination and reduction of such a precipitate, the nickel atoms form 75% of the total number of atoms, other than oxygen atoms, in the catalyst.

We have found that certain nickel containing catalysts having an appreciably higher proportion of nickel atoms not only have a high activity but also give rise to significantly decreased amounts of by-products. Consequently with these catalysts, higher reaction temperatures can be employed, if desired, thereby altering the composition of the alkylamines product.

Accordingly the present invention provides a process for the manufacture of alkyl amines comprising reacting at least one amino compound of the formula R'R"R'"N where R', R" and R'", which may be the same or different, are hydrogen or alkyl groups, and at least one alcohol of the formula ROH wherein R is an alkyl group and not all the groups, R, R', R", R'" are the same, in the presence of a catalyst comprising at least one metal from Group VIII of the Periodic Table selected from nickel and cobalt, intimately associated with at least one difficultly reducible metal oxide, said Group VIII metal constituting 80 to 98% of the total number of atoms, other than oxygen atoms and carbon (if any) atoms, in said catalyst.

The groups R', R" and R'" may be hydrogen or alkyl groups. Preferably at least some of the R', R" and R'" are hydrogen.

Two of the alkyl groups R', R" and R'" may be joined as in an alkylene group, e.g. containing 2 to 12 carbon atoms. As examples of alkyl groups for the groups R, R', R" and R'", there may be mentioned especially primary monovalent alkyl groups having 1–20 carbon atoms, substituted primary monovalent alkyl groups in which the substituents are not amine-reactive or water-reactive (for example are aryl, alkoxy or fluoro). Analogous secondary alkyl groups, including cycloalkyl groups, can be used, but there may be formation of claims by side reactions: for this reason tertiary alkyl groups are not usually suitable. The alkyl groups preferably contain 2 to 6 carbon atoms. Especially preferred alkyl groups are ethyl, isopropyl, secondary butyl, or cyclohexyl.

It is preferred that the alkyl groups, if any, in the amino compound are the same as that of the alcohol: in this case at least one of the groups R', R" and R'", of the amino compound should be hydrogen, although the corresponding t-amine may be present in the reaction mixture, together with ammonia and/or the corresponding primary and/or secondary amine, to modify the composition of the alkylamines mixture produced in the reaction. In this case the reaction is:

$$ROH + NH_nR_{3-n} \rightleftharpoons NH_{n-1}R_{4-n} + H_2O$$

where $NH_nR_{3-n}$, n being between 1 and 3, represents the composition of the amino compound or mixture thereof (excluding any t-amine present) fed to the reaction.

In a preferred process the amino compound comprises ammonia, optionally together with recycled unwanted alkylamines separated from the alkylamines product.

The reaction is preferably effected at a temperature in the range 100° to 250° C. at a pressure of 1 to 40 bar absolute. The temperature and pressure are preferably such that the feedstock is in the gaseous state. In some cases it may be desirable to include a proportion of hydrogen in the feed to maintain the catalyst in the reduced state.

For the reaction of alcohols with ammonia, the ammonia to alcohol molecular ratio is typically up to 6, depending on the intended ratio of product amines. The alcohol/ammonia reactions are exothermic, to an extent depending on the proportion of recycled over-alkylated amine present, hence the process is carried out preferably in heat exchange with a coolant such as boiling water or an organic heat exchange fluid such as diphenyl/diphenyl ether. For this reason the catalyst is disposed preferably in tubes (typically of inside diameter 20–200 mm) surrounded by coolant: alternatively the coolant can be in the tubes and the coolant in the space outside the tubes.

In the present invention the catalyst employed comprises at least one Group VIII metal selected from nickel and cobalt intimately associated with at least one difficultly reducible metal oxide.

While catalysts wherein the Group VIII metal is essentially only cobalt have a lower activity than catalysts wherein the Group VIII metal is nickel, catalysts containing both cobalt and nickel show an activity greater than that of catalysts wherein the Group VIII metal is only nickel. Because of the higher cost of cobalt, compared to nickel, it is preferred that the Group VIII metal is nickel or a nickel/cobalt mixture in which the nickel:cobalt atomic ratio is above 0.5, particularly in the range 1 to 5, and especially above 2.

The catalyst employed in the process of the invention have a relatively high Group VIII metal content: thus the Group VIII metal forms 80–98%, preferably 85–95%, of the total number of atoms other than oxygen and carbon (if any) atoms, (i.e. the Group VIII metal atoms plus the metal atoms of the difficultly reducible metal oxide) in the catalyst.

The difficultly reducible oxide can be any oxide of a metal from an A sub-Group (other than Group 1A) of the Periodic Table. Preferably it is from Group IIIA (including rare earths, thoria, and urania) or from Group IVA. Preferably two or more such oxides are present, especially combinations of oxides of aluminium and one or more rare earths, particularly lanthanum and/or cerium; the so-called technical grades comprising a mixture of rare earths may be employed.

The catalyst should be essentially free of other metals or oxides although small amounts thereof may in fact be present as impurities.

The intimate association of the active metal, i.e. the Group VIII metal, and the difficultly reducible oxide can be the result of precipitation, as, for example, hydroxides and/or carbonates, or of applying a solution of a compound of the active metal to a highly adsorptive (surface area over 50, especially over 100, $m^2.g^{-1}$) form of the oxide, followed by reduction of the Group VIII metal compound to metal and, if necessary, decomposition of the A sub-Group metal compound to the difficultly reducible oxide.

The catalysts are preferably obtained by sequential or particularly by simultaneous precipitation as hydroxides and/or carbonates followed by calcination to decompose the A sub-Group metal compound to the oxide and then, if necessary, a further reduction to convert the Group VIII metal compound to active metal.

While the reduction to active metal, which is normally effected by heating the catalyst precursor in a hydrogen containing gas stream, can in some cases be effected in the vessel to be used for the alkylamine reaction, it is preferred to effect reduction of the precursor to active metal off-line. Preferably the catalyst precursor is reduced to active metal at a temperature in the range 300–600, particularly 300°–450° C.

The catalyst is preferably employed in the form of small particles such as granules or pellets. Where made by a precipitation route, the precipitated mixture is preferably pelleted after calcination to decompose the precipitate to oxides. However pelleting may be facilitated if calcination prior to pelleting is incomplete so that the calcined mixture contains hydroxides and/or carbonates. Further heating of the pellets to complete the decomposition to oxides may be effected before or during reduction of the Group VIII metal compound to active metal. Such heating is preferably effected prior to reduction as we have found that reduction of pellets that have not been completely decomposed to oxide is liable to give rise to significant exotherms in the reduction process leading to difficulties in temperature control.

The reduced catalyst may be stabilized, to aid handling prior to use, by treatment with an inert gas stream containing a small controlled proportion of oxygen or carbon dioxide during cooling from the reduction temperature.

The surface area of the active metal in the freshly reduced catalyst is preferably at least 50 $m^2.g^{-1}$ of catalyst.

The invention is illustrated by the following examples

EXAMPLE 1

A precipitate was prepared by continuously supplying an aqueous solution, at about 70° C., containing 322 $g.l^{-1}$ nickel nitrate hexahydrate, 23.6 $g.l^{-1}$ aluminium nitrate nonahydrate, and 8.1 $g.l^{-1}$ cerium nitrate hexahydrate to a small precipitation vessel to which was also supplied an aqueous solution, also at about 70° C., containing 150 $g.l^{-1}$ of sodium carbonate decahydrate, in an amount to maintain the pH in the vessel at about 7. The precipitate was continuously removed from the vessel, filtered hot, washed, and dried for 16 hours at 110° C. The dried precipitate was then calcined for 4 hours at 350° C. The calcined product had the following composition (after ignition at 900° C.):

| oxide | % by weight |
|---|---|
| NiO | 93.1 |
| $Al_2O_3$ | 3.7 |
| $CeO_2$ | 3.1 |
| $Na_2O$ | 0.1 |

The loss on ignition at 900° C. was 11.3% by weight. The nickel atoms thus formed about 93% of the total number of atoms (other than oxygen atoms) in the calcined catalyst precursor. The calcined product had the following micromeritic properties:

| | |
|---|---|
| BET (nitrogen) surface area | 213 $m^2 \cdot g^{-1}$ |
| helium density | 5.07 $g \cdot cm^{-3}$ |
| mercury density | 2.44 $g \cdot cm^{-3}$ |
| pore volume | 0.21 $m^2 \cdot g^{-1}$. |

The calcined product was mixed with 1.5% of its weight of graphite and compressed into cylindrical pellets of 3.7 mm diameter and 3.3 mm height.

A bed of the pellets was charged to a laboratory reactor which was then heated to 350° C. for 32 hours while a stream of equal volumes of hydrogen and nitrogen were passed through the bed. The nitrogen/hydrogen gas stream was then replaced by a nitrogen gas stream, while the reactor was cooled to about 100° C. After 1 hour at 100° C., 0.5% by volume or air was bled into the nitrogen stream for 2 hours. The concentration of air in the gas stream was then doubled every 30 minutes until roughly proportions of air and nitrogen were achieved. The reactor was then cooled to room temperature.

24 ml (37.6 g) of this pre-reduced, air stabilized, catalyst (catalyst A) was charged to a laboratory reactor of 1.9 cm interior diameter and re-reduced overnight at 150° C. with a gas stream containing 9 volumes of nitrogen: 1 volume of hydrogen. A mixture of ethanol (0.127 $mol.hr^{-1}$), ammonia (0.254 $mol.hr^{-1}$) and hydrogen (0.25 $mol.hr^{-1}$) was then passed over the catalyst at 180° C. and the exit gas analysed for ethylamines, methane, and higher molecular weight products ("heavies"). The test procedure was repeated using a reaction temperature of 200° C.

EXAMPLE 2

Example 1 was repeated using a nitrates solution of the following composition (per liter)
128 ml cobalt nitrate solution (cobalt content 17% by weight)
215.4 g nickel nitrate hexahydrate
7.9 g cerium nitrate hexahydrate
23.0 g aluminium nitrate nonahydrate.

The bluish/purple precipitate was filtered, washed, dried, and calcined as in Example 1 except that the drying was effect at 120° C. and the calcination at 300° C.

The calcined product had the following composition (after ignition at 900° C.)

| oxide | % by weight |
|---|---|
| NiO | 59.9 |
| CoO | 32.8 |
| $Al_2O_3$ | 3.0 |
| $CeO_2$ | 3.7 |
| $Na_2O$ | 0.1 |

The BET surface area was 157 $m^2.g^{-1}$

The catalyst (catalyst B) was tested as in Example 1 except that the reduction was effected at 450° C. for 18 hours.

EXAMPLE 3

Example 2 was repeated using a nitrates solution of the following composition (per liter)
256 ml cobalt nitrate solution (cobalt content 17% by weight)
107.7 g nickel nitrate hexahydrate
7.9 g cerium nitrate hexahydrate
23.0 g aluminium nitrate nonohydrate.

The precipitate was redish/purple.

The calcined product had the following composition (after ignition at 900° C.)

| oxide | % by weight |
|---|---|
| NiO | 29.4 |
| CoO | 63.6 |
| $Al_2O_3$ | 2.9 |
| $CeO_2$ | 3.7 |
| $Na_2O$ | <0.1 |

The BET surface area was 124 $m^2.g^{-1}$. The catalyst was designated C.

EXAMPLE 4

Example 2 was repeated using a nitrates solution of the following composition (per liter)
384 ml cobalt nitrate solution (cobalt content 17% by weight)
7.9 g cerium nitrate hexahydrate
23.0 g aluminium nitrate nonahydrate.

The precipitate was mauve/pink.

The calcined product had the following composition (after ignition at 900° C.)

| oxide | % by weight |
|---|---|
| NiO | 0.7 |
| CoO | 93.0 |
| $Al_2O_3$ | 2.6 |
| $CeO_2$ | 3.6 |
| $Na_2O$ | 0.1 |

The nickel oxide probably results from nickel impurity in the cobalt nitrate solution.

The BET surface area was 167 $m^2.g^{-1}$

The catalyst was designate D.

EXAMPLE 5

The test procedure was repeated using a standard commercially available, nickel catalyst (catalyst E), sold for alkylamine production.

The results are shown in the following table

| Catalyst | Ni/Co ratio | Temp. (°C.) | Time on line (hrs) | Ammonia to alcohol molar ratio | Conversion* (%) | Exit gas methane (% v/v) | "heavies" (% v/v) |
|---|---|---|---|---|---|---|---|
| A | ∞ | 180 | 185 | 2 | 93.0 | 0.3 | 0.0 |
| B | 1.86 | 180 | 12 | 1.8 | 92.2 | 0.1 | 0.0 |
| C | 0.46 | 180 | 15 | 2.1 | 89.9 | 0.2 | 0.0 |
| D | 0.01 | 180 | 73 | 1.7 | 69.2 | 0.3 | 0.0 |
| E+ | — | 180 | 77 | 2 | 92.0 | 1.2 | 1.0 |
| A | ∞ | 200 | 220 | 2 | 97.5 | 0.6 | 0.0 |
| B | 1.86 | 200 | 155 | 2.3 | 98.9 | 0.2 | 0.0 |
| C | 0.46 | 200 | 125 | 2.15 | 98.9 | 0.2 | 0.0 |
| D | 0.01 | 200 | 150 | 1.85 | 85.2 | 0.2 | 0.0 |
| E+ | — | 200 | 156 | 2 | 89.6 | 4.0 | 3.2 |

*percentage of ethanol converted to ethylamines
+comparative

It is seen that not only can high conversions be achieved with the catalysts of the invention but also the proportion of by-products is much reduced.

Analysis of the ethylamines produced at 200° C. gave the following results:

| Catalyst | (% w/w) Ethylamines produced | | |
|---|---|---|---|
| | Primary | secondary | tertiary |
| A | 32 | 58 | 10 |
| B | 43 | 44 | 13 |
| C | 41 | 45 | 14 |
| D | 48 | 39 | 13 |
| E+ | 38 | 51 | 10 |

+comparative.

I claim:

1. A process for the manufacture of ethylamines comprising reacting ammonia and ethanol in the gaseous state in the presence of a catalyst containing at least one metal of Group VIII of the Periodic Table selected from cobalt and nickel intimately associated with alumina and at least one rare earth metal oxide, the Group VIII metal atoms constituting 80 to 90% of the total number of atoms, other than oxygen and carbon (if any) atoms, in said catalyst.

2. A process according to claim 1 wherein the catalyst contains nickel and cobalt and has a nickel/cobalt atomic ratio in the range 1 to 5.

3. A process according to claim 1 wherein the catalyst is made by reducing, at a temperature in the range 300° to 600° C., nickel, and/or cobalt, oxide, in intimate admixture with alumina and at least one rare earth metal oxide, said intimate mixture of oxides being obtained by calcining an intimate mixture of precipitated hydroxides, and/or carbonates, of nickel and/or cobalt,
aluminium, and
at least one rare earth metal.

4. A process according to claim 1 wherein the catalyst has a metal surface area of at least 50 $m^2.g^{-1}$.

5. A process according to claim 1 wherein the reaction of the alcohol and amino compound is effected at a temperature in the range 100° to 250° C.

* * * * *